(12) United States Patent
Saito (10) Patent No.: US 8,176,535 B2
(45) Date of Patent: May 8, 2012

(54) INFORMATION PROCESSING SYSTEM, INFORMATION PROCESSING METHOD, AND COMPUTER READABLE MEDIUM

(75) Inventor: Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 386 days.

(21) Appl. No.: 12/474,578

(22) Filed: May 29, 2009

(65) Prior Publication Data

US 2010/0132052 A1    May 27, 2010

(30) Foreign Application Priority Data

Nov. 25, 2008 (JP) ................................ 2008-299567

(51) Int. Cl.
*G06F 17/30* (2006.01)
*G06F 7/04* (2006.01)
*G06F 1/24* (2006.01)
*G06F 21/00* (2006.01)

(52) U.S. Cl. .................... 726/6; 726/2; 726/18; 726/27; 713/100; 713/182

(58) Field of Classification Search .................. 726/6, 2, 726/18, 27; 713/100, 182
See application file for complete search history.

(56) References Cited

U.S. PATENT DOCUMENTS

| | | | |
|---|---|---|---|
| 5,918,210 A * | 6/1999 | Rosenthal et al. | 705/7.11 |
| 7,305,419 B1 * | 12/2007 | Cosby et al. | 1/1 |
| 2005/0021980 A1 | 1/2005 | Kanai | |
| 2006/0047731 A1 | 3/2006 | Matsui | |
| 2006/0143685 A1 * | 6/2006 | Vasishth et al. | 726/1 |
| 2008/0104663 A1 | 5/2008 | Tokutani et al. | |
| 2009/0083831 A1 | 3/2009 | Kanai | |
| 2010/0175105 A1 * | 7/2010 | Vasishth et al. | 726/1 |

FOREIGN PATENT DOCUMENTS

| | | |
|---|---|---|
| JP | 2005-38371 A | 2/2005 |
| JP | 2005-202769 A | 7/2005 |
| JP | 2005-293513 A | 10/2005 |
| JP | 2006-99736 A | 4/2006 |
| JP | 2008-052647 A | 3/2008 |
| JP | 2008-117026 A | 5/2008 |

OTHER PUBLICATIONS

Japanese Office Action issued on Oct. 19, 2010 in the corresponding Japanese Patent Application No. 2008-299567.

* cited by examiner

*Primary Examiner* — Mohammad Reza
(74) *Attorney, Agent, or Firm* — Sughrue Mion, PLLC (57) ABSTRACT

An information processing system includes: an organization information storage that stores organization information which defines an organization including users and groups of the users; a usage control information storage that stores usage control information which is for controlling use of control target information by each user in the organization defined by the organization information and defining a user or a group of users who or which is permitted to use the control target information and a usage range of the control target information in which the user or the group of the users is permitted to use the control target information; a judgment unit that judges whether or not an inconvenience resulting from a change of the organization occurs in the usage control information stored in the usage control information storage based on the organization information stored in the organization information storage; and a countermeasure unit that performs a countermeasure against the inconvenience in a case where the judgment unit judges that the inconvenience resulting from the change of the organization occurs.

9 Claims, 9 Drawing Sheets

| POLICY ID | POLICY NAME | PERMITTED USER | REGISTRATION RIGHT | PERMITTED USE RANGE | STATUS |
|---|---|---|---|---|---|
| 0001 | FOR GROUP A | REGISTERER | — | READING, EDITING, PRINTING | VALID |
| | | GROUP A | PRESENT | READING, PRINTING | |
| | | GROUP B | ABSENT | READING | |
| 0002 | FOR GROUP C | REGISTERER | — | READING, EDITING, PRINTING | VALID |
| | | GROUP C | PRESENT | READING, PRINTING | |
| | | GROUP D | ABSENT | READING | |
| ... | ... | ... | ... | ... | ... |

FIG. 4

| CONTENT ID | POLICY ID | ID FOR REGISTERER | DATE AND TIME OF REGISTRATION | STATUS |
|---|---|---|---|---|
| 40ffaaa4-0fb6-4634-85bf-bba45bc941b5 | 0001 | USER a | 10:00, JULY 1, 2008 | VALID |
| 4FB6BB00-3347-11d0-B40A-00AA005FF586 | 0004 | USER b | 10:00, AUGUST 12, 2008 | VALID |
| ... | ... | ... | ... | ... |

| JUDGMENT CONDITION | COUNTERMEASURE |
|---|---|
| USE RANGE OF SUBORDINATE GROUP IS EQUAL TO OR WIDER THAN USE RANGE OF SUPERORDINATE GROUP IN POLICY | TEMPORARILY HALT TARGET POLICY |
| POLICY IS ASSOCIATED WITH PLURALITY OF INDEPENDENT GROUPS | TEMPORARILY HALT TARGET POLICY |
| ... | ... |

| JUDGMENT CONDITION | COUNTERMEASURE |
|---|---|
| REGISTERER OF CONTENT HAS NO REGISTRATION RIGHT | TEMPORARILY HALT TARGET CONTENT |
| REGISTERER OF CONTENT DOES NOT BELONG TO ANY GROUP PERMITTED BY POLICY | TEMPORARILY HALT TARGET CONTENT |
| ... | ... |

| INSPECTION TARGET | JUDGMENT CONDITION | COUNTERMEASURE |
|---|---|---|
| POLYCY | USE RANGE OF SUBORDINATE GROUP IS EQUAL TO OR WIDER THAN USE RANGE OF SUPERORDINATE GROUP IN POLICY | TEMPORARILY HALT TARGET POLICY |
| POLYCY | POLICY IS ASSOCIATED WITH PLURALITY OF INDEPENDENT GROUPS | TEMPORARILY HALT TARGET POLICY |
| POLYCY | REGISTERER OF CONTENT HAS NO REGISTRATION RIGHT | TEMPORARILY HALT TARGET CONTENT |
| POLYCY | REGISTERER OF CONTENT DOES NOT BELONG TO ANY GROUP PERMITTED BY POLICY | TEMPORARILY HALT TARGET CONTENT |
| | ... | ... |

INFORMATION PROCESSING SYSTEM, INFORMATION PROCESSING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-299567 filed Nov. 25, 2008.

BACKGROUND

1. Technical Field

The present invention relates to an information processing system, an information processing method, and a computer readable medium.

2. Related Art

There has been known a digital rights management (DRM: Digital Rights Management) technique which controls use of contents by using a security policy. The DRM technique controls a permitted user for which the use of the content is permitted, a permitted period, and a permitted operation for each content.

SUMMARY

According to an aspect of the present invention, an information processing system includes: an organization information storage that stores organization information which defines an organization including users and groups of the users; a usage control information storage that stores usage control information which is for controlling use of control target information by each user in the organization defined by the organization information and defining a user or a group of users who or which is permitted to use the control target information and a usage range of the control target information in which the user or the group of the users is permitted to use the control target information; a judgment unit that judges whether or not an inconvenience resulting from a change of the organization occurs in the usage control information stored in the usage control information storage based on the organization information stored in the organization information storage; and a countermeasure unit that performs a countermeasure against the inconvenience in a case where the judgment unit judges that the inconvenience resulting from the change of the organization occurs.

BRIEF DESCRIPTION OF THE DRAWINGS

Exemplary embodiment of the present invention will be described in detail based on the following figures, wherein.

DETAILED DESCRIPTION

A description will be given hereinafter of embodiments of the present invention with reference to the drawings.

(First Embodiment)

Figure 1:
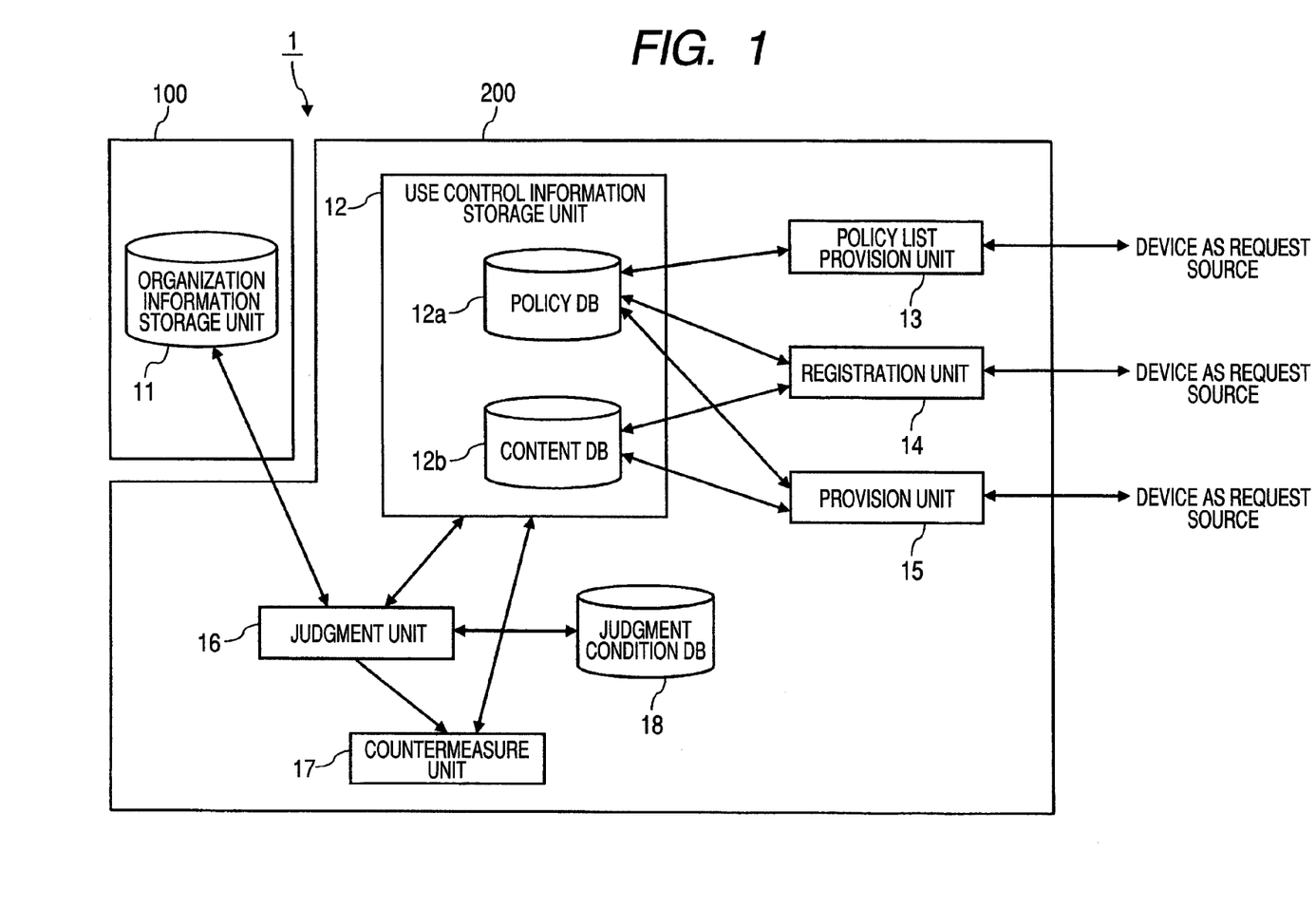
FIG. 1 is a block diagram showing one example of a structure of an information usage control system including an information processing system according to an embodiment.

FIG. 1 is a block diagram showing one example of a structure of an information usage control system 1 including an information processing system according to the present embodiment. The information usage control system 1 is a system which controls the use of control target information by a user by using usage control information.

The control target information mentioned herein is information as a target for usage control and includes contents such as, e.g., a document, a moving image, a still image, a sound, and the like. The control target information is electronic data in one implementation. However, it may be information in the form other than the form of the electronic data such as information described on paper (paper document) and the like.

The usage control information is information for controlling the use of contents and is referred to as, e.g., a security policy.

In one specific implementation, the information usage control system 1 is a DRM system which controls the use of contents by using the security policy.

In the following description, the control target information, the usage control information, and the user will be referred to as "a content", "a policy", and "a user", respectively.

In FIG. 1, the information usage control system 1 has an organization information storage unit 11, a usage control information storage unit 12, a policy list provision unit 13, a registration unit 14, a provision unit 15, a judgment unit 16, and a countermeasure unit 17.

In one implementation, the information usage control system 1 is implemented by cooperation between a hardware resource and software, and is implemented by, e.g., one or more computers. Specifically, a program recorded in a recording medium is read into a main memory device (main memory) and executed by a central processing unit (CPU: Central Processing Unit), whereby individual functions of the information usage control system 1 are implemented. It is possible to provide the above-mentioned program that is recorded in a computer-readable recording medium such as a CD-ROM or the like, and also possible to provide the program as data signals through communications. It is to be noted that the information usage control system 1 may be implemented only by the hardware.

Figure 2:
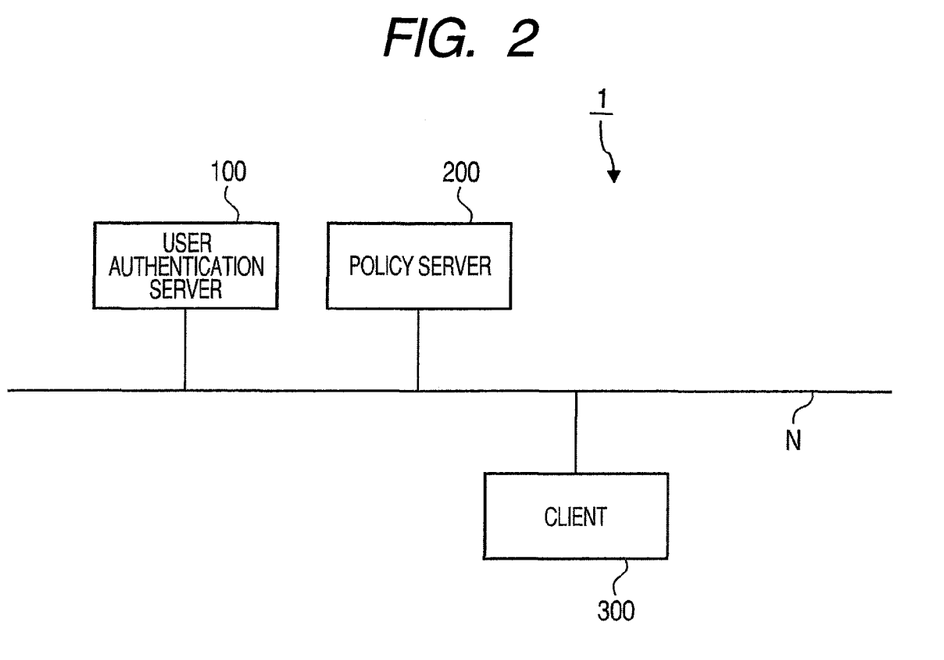
FIG. 2 is a schematic view showing one example of a physical structure of the information usage control system of FIG. 1.

The information usage control system 1 may be implemented with various physical structures and, for example, the information usage control system 1 is implemented with a structure shown in FIG. 2. In FIG. 2, the information usage control system 1 has a user authentication server 100, a policy server 200, and a client 300 each connected to a network N such as the Internet, a LAN (Local Area Network), or the like.

The user authentication server 100 includes the organization information storage unit 11 and has functions of managing information in the organization information storage unit 11 and performing user authentication based on the information. The user authentication server 100 includes, e.g., a LDAP (Lightweight Directory Access Protocol) server, an active directory server, and the like.

The policy server 200 includes the usage control information storage unit 12, the policy list provision unit 13, the registration unit 14, the provision unit 15, the judgment unit 16, and the countermeasure unit 17, and performs the management of information in the usage control information storage unit 12 and the usage control of the content based on the information in the usage control information storage unit 12.

The client 300 has functions of producing a content protected by imparting a policy to an unprotected content and allowing the use of the protected content within a range permitted by the policy by communicating with the policy server 200.

The policy server 200 and the client 300 authenticate the user and provide the function of the information usage control system 1 to the authenticated user. At that time, the user authentication server 100 may be caused to perform the user authentication.

Returning back to FIG. 1, function blocks 11 to 17 of the information usage control system 1 will be described.

The organization information storage unit 11 stores organization information for defining an organization including users and groups of the users. Specifically, the organization information is information for defining the users constituting the organization, the groups included in the organization, the users belonging to the individual groups, relations between the groups, and the like, and is the information, for example, for hierarchically managing the users and the groups. The organization information may include information for authentication to be used for the authentication of the individual users (e.g., a user ID and a password). The organization information in the organization information storage unit 11 is changed by a manager or the like in response to a change of the organization. Examples of the change of the organization include the change of the group to which the user belongs, the change of the relation between the groups, addition and deletion of the user or the group, and the like.

The usage control information storage unit 12 stores a policy for controlling the use of the content by the user in the organization defined by the above-mentioned organization information.

The policy is information for defining the user or the group of the user permitted to use the content, and a usage range of the content permitted for the user or the group of the user. Specifically, the policy includes information indicative of the user or the group permitted to use the content, and usage range information indicative of the usage range of the content permitted for the user or the group. The usage range information includes information indicative of, e.g., a permitted period in which the use of the content is permitted, a permitted number of times, and a permitted operation, or a combination thereof. In other words, the policy is information indicating which user is permitted to perform which operation during what period. The policy in the usage control information storage unit 12 is registered, changed, or deleted by, e.g., the manager.

In one implementation, the usage control information storage unit 12 is structured to store one or more pre-created common policies and, at the same time, store the association between the content and the policy so that a plurality of different contents can be protected by the same policy. It is to be noted that the usage control information storage unit 12 may store, e.g., a policy for a specific content in association with the specific content.

In the example of FIG. 1, the usage control information storage unit 12 has a policy database (hereinafter referred to as "a policy DB") 12a for managing the policy and a content database (hereinafter referred to as "a content DB") 12b for managing the association between the content and the policy to be applied to the content.

Figure 3:
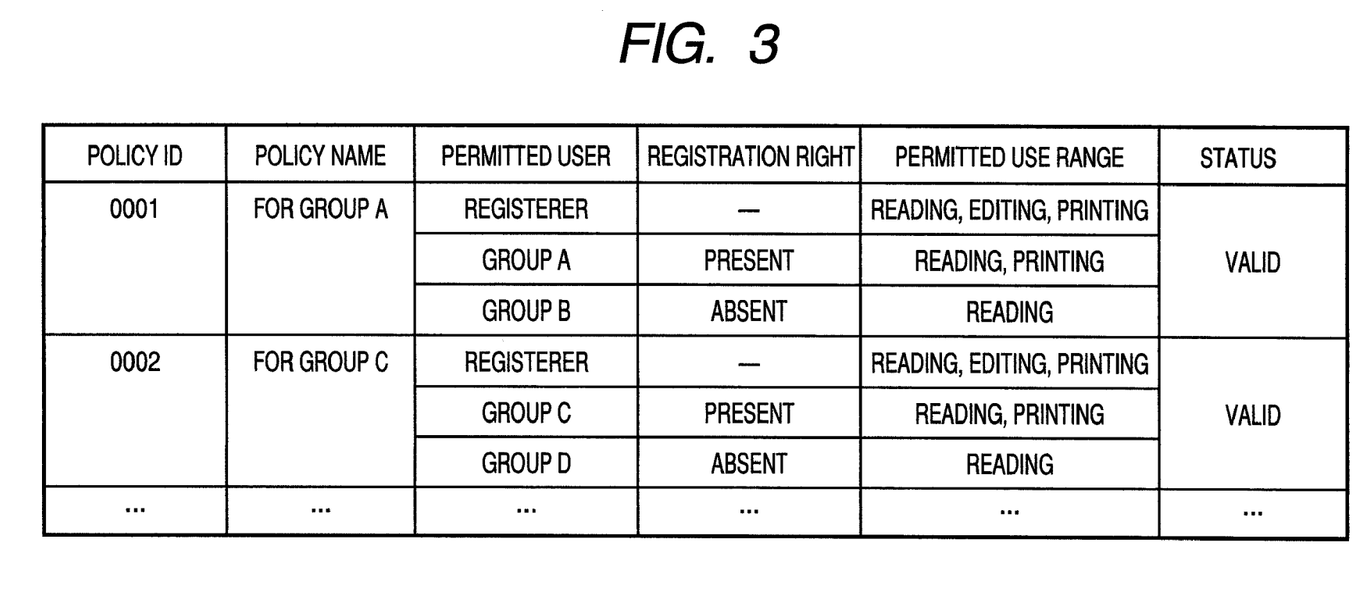
FIG. 3 is a view showing one example of stored contents in a policy DB.

FIG. 3 is a view showing one example of stored contents in the policy DB 12a. In FIG. 3, for each of policies, a policy ID as identification information for identifying the policy, a policy name as a name of the policy, a nature of the policy, and a status of the policy are recorded in association with one another in the policy DB 12a.

Each of the policies includes information indicative of one or more users or groups permitted to use the content, and the usage range information defined for each of the users or the groups. In FIG. 3, the usage range information includes information indicative of a permitted operation. In addition, in the example of FIG. 3, each policy includes information indicative of the presence or absence of a registration right for each user or group. The presence or absence of the registration right means the presence or absence of a right of registering the policy and the content in association with each other, i.e., a right of associating the policy with the content (a right of producing the content protected by the policy).

The status of a policy indicates whether or not the use of the content associated with the policy is permitted. When the status is "VALID", the use of the content is permitted, while when the status is "HALT", the use of the content is halted.

Figure 4:
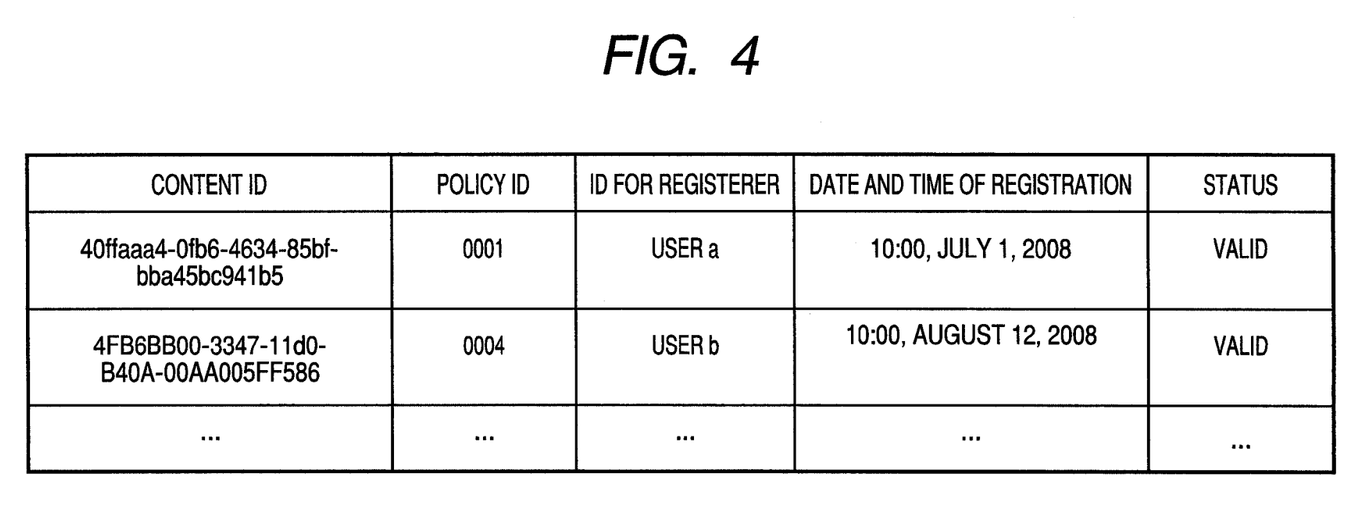
FIG. 4 is a view showing one example of stored contents in a content DB.

FIG. 4 is a view showing one example of stored contents in the content DB 12b. In FIG. 4, a content ID as identification information for identifying the content, the policy ID for the policy to be applied to the content, a user ID for a registrant of the content, a date and time of registration of the content, and the status of the content are recorded in association with one another for each content in the content DB 12b.

The "registration" of the content mentioned above means registering the content in association with the policy, the registrant of the content is a user who has registered the association between the content and the policy in the content DB 12b, and the date and time of registration of the content is a date and time when the association between the content and the policy has been registered in the content DB 12b.

The content ID is, e.g., a UUID (Universal Unique Identifier).

The status of the content indicates whether or not the use of the content is permitted. When the status is "VALID", the use of the content is permitted, while when the status is "HALT", the use of the content is halted.

When receiving a request for a policy list from the user, the policy list provision unit 13 provides a list of policies registered in the policy DB 12a to the user as the request source. The policy list is requested, e.g., at the time of associating the policy with the content.

Specifically, when receiving the request for the policy list including the user ID for a requester from a device as the request source such as the client 300 or the like, the policy list provision unit 13 provides the list of, among policies registered in the policy DB 12a, policies whose registration rights are held by the user indicated by the above-mentioned user ID to the device as the request source.

At the time of provision of the policy list mentioned above, the user authentication is performed by the policy list provision unit 13 or the device as the request source based on the information in the organization information storage unit 11. When the user authentication succeeds, the policy list provision unit 13 provides the policy list in response to the request from the authenticated user.

The registration unit 14 registers the association between the content and the policy to be applied to the content in the content DB 12b in response to the request from the user in the organization defined by the organization information.

Specifically, the registration unit 14 receives a registration request including the content ID for the content to be protected, the policy ID for the policy to be applied to the content, and the user ID for the user (the registrant) from the device as the request source such as the client 300 or the like, and registers the content ID, the policy ID, the user ID, and the date and time of the registration in association with one another in the content DB 12b. As the date and time of the registration, for example, there is used a date and time based on a clock of the registration unit 14 when the registration unit 14 receives the registration request.

At the time of registration of the association mentioned above, the user authentication based on the information in the organization information storage unit 11 is performed by the registration unit 14 or the device as the request source. Then, when the user authentication succeeds, the registration unit 14 registers the association in response to the request from the authenticated user.

In the following description, as described above, the content associated with the policy, i.e., the content protected by the policy will be referred to as "a protected content". In one implementation, the content ID is imparted to the protected content by, e.g., the device as the request source such as the client 300 or the like.

Figure 5:
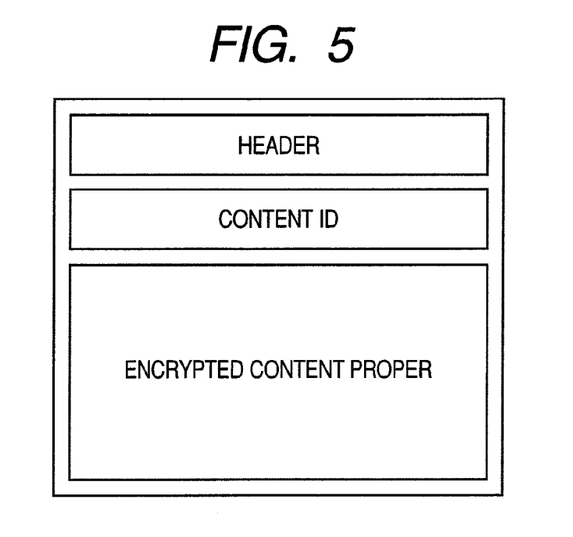
FIG. 5 is a view showing one example of a structure of a protected content.

FIG. 5 shows one example of a structure of the protected content. In FIG. 5, the protected content includes a header indicating that the content is the protected content, the content ID for the content, and the encrypted content proper. The content proper is encrypted by an encryption key common to all of the protected contents. However, the content proper may or may not be encrypted by the encryption key different for each of the protected contents. In addition, in order to prevent tampering with the content ID (for example, replacing the content ID with another content ID), an electronic signature or a value such as a HMAC (Keyed-Hashing for Message Authentication code) may be imparted to the entire protected contents.

When receiving a request for use information in correspondence to the protected content from the user in the organization defined by the organization information, the provision unit 15 provides the use information for using the protected content to the user as the request source based on the policy associated with the protected content.

Specifically, when receiving the request for the use information in correspondence to the protected content from the user, the provision unit 15 determines whether or not the use of the protected content is permitted for the user based on the policy stored in association with the protected content. When it is determined that the use of the protected content is permitted, the provision unit 15 provides the use information for using the protected content to the user as the request source based on the usage range permitted for the user by the above-mentioned policy. On the other hand, when it is determined that the use of the protected content is not permitted, the provision unit 15 returns information indicating that the use is not permitted to the user as the request source.

The use information includes information indicative of the usage range permitted for the user, information allowing the use of the protected content, and information required for the use of the protected content, and may be information called, e.g., a license.

For example, when receiving a request including the content ID for the protected content and the user ID for the user who is to use the protected content from the device as the request source such as the client 300 or the like, the provision unit 15 refers to the policy DB 12a and the content DB 12b and specifies the policy associated with the protected content based on the content ID mentioned above. Subsequently, the provision unit 15 determines whether or not the use of the content is permitted for the user indicated by the above-mentioned user ID based on the policy. Then, when it is determined that the use is permitted, the provision unit 15 sends the use information indicative of the usage range permitted for the user based on the policy to the device as the request source. On the other hand, when it is determined that the use is not permitted, the provision unit 15 sends the information indicating that the use is not permitted to the device as the request source.

At the time of provision of the use information described above, the user authentication based on the information in the organization information storage unit 11 is performed by the provision unit 15 or the device as the request source. Subsequently, when the user authentication succeeds, the provision unit 15 provides the use information in response to the request from the authenticated user.

In a case where the device as the request source receives the information indicating that the use is not permitted from the provision unit 15, the device as the request source does not permit the use of the content, while in a case where the device as the request source receives the use information, the device as the request source performs a process for using the protected content based on the use information. Examples of the process for using the protected content include a process for executing operations (displaying, editing, printing, and the like) with respect to the protected content from the user, a process for clearing protection such as the encryption of the protected content or the like.

The judgment unit 16 judges whether or not an inconvenience resulting from the change of the organization occurs in the policies stored in the usage control information storage unit 12 based on the organization information stored in the organization information storage unit 11.

Specifically, the judgment unit 16 refers to the organization information in the organization information storage unit 11, and judges whether or not the inconvenience resulting from the change of the organization occurs in each of the policies stored in the policy DB 12a based on a preset judgment condition. For example, the judgment unit 16 judges whether or not the judgment condition is satisfied for each of the policies. The judgment condition may appropriately be set so as to be capable of detecting the inconvenience resulting from the change of the organization, and may be set, e.g., in the organization.

The timing of execution of the above-mentioned judgment is not particularly limited, and examples thereof include a periodic timing (e.g., at two o'clock in the morning every day), a time when the organization information is changed, a time when the execution of the judgment is instructed by the manager, and the like.

Examples of the above-mentioned inconvenience resulting from the change of the organization include, e.g., (a 1) and (a 2) shown below.

(a 1) In a case where a creation rule of the policy is determined in the organization, and the policy is created in accordance with the creation rule and registered, when the the organization is changed, a violation, a contradiction, or a discrepancy with respect to the creation rule may occur in the policy created with the organization before the change as a precondition. It can be said that the violation, the contradiction, or the discrepancy with respect to the creation rule is one of the inconveniences resulting from the change of the organization. The foregoing creation rule may or may not be incorporated in the information usage control system 1. When the creation rule is not incorporated in the system 1, a policy creator creates the policy so as not to violate the creation rule and registers the policy. When the creation rule is incorporated in the system 1, the system 1 registers only the policy that does not violate the creation rule in the policy DB 12a based on information indicative of a pre-stored creation rule. In this case, the judgment unit 16 may judge whether or not each of the policies stored in the policy DB 12a violates the creation rule based on the information indicative of the above-mentioned pre-stored creation rule.

(a 2) In a case where the policy creator creates the policy under a specific intention and registers the policy, when the organization is changed, the contradiction or the discrepancy with respect to the initial intention of the creation may occur in the policy created with the organization before the change as the precondition. It can be said that the contradiction or the discrepancy with respect to the initial intention of the creation is one of the inconveniences resulting from the change of the organization.

In the example of FIG. 1, the information usage control system 1 has a judgment condition database (hereinafter referred to as "a judgment condition DB") 18 for managing the judgment condition, and the judgment unit 16 judges whether or not the inconvenience resulting from the change of the organization occurs in each of the policies in the policy DB 12a based on the judgment condition registered in the judgment condition DB 18.

Figure 6:
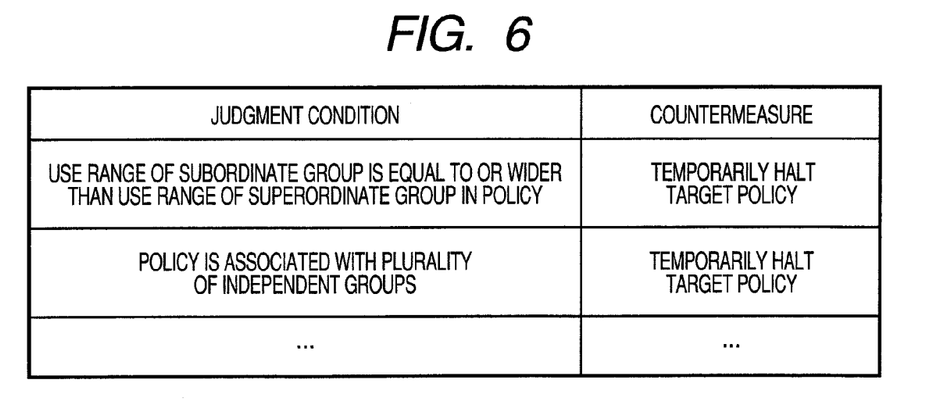
FIG. 6 is a view showing one example of stored contents in a judgment condition DB in a first embodiment.

FIG. 6 shows one example of stored contents in the judgment condition DB 18. In FIG. 6, the judgment condition and a countermeasure to be taken when the judgment condition is satisfied are registered in association with each other.

When the judgment unit 16 judges that the inconvenience resulting from the change of the organization occurs, the countermeasure unit 17 takes a countermeasure against the inconvenience.

The countermeasure against the inconvenience is, e.g., a process for preventing unintended use of the content. Specifically, examples of the countermeasure against the inconvenience include a process for halting the use of the policy in which the inconvenience is judged to occur (hereinafter referred to as "a target policy"), a process for halting the use of the content associated with the target policy, a process for canceling permission for the use by, among the users or the groups permitted by the target policy, a part of the users or the groups (for example, the users or the groups that cause the inconvenience), and a process for narrowing the usage range permitted by the target policy (for example, limiting the usage range only to reading).

In one implementation, when the judgment unit 16 judges that the judgment condition is satisfied, the countermeasure unit 17 refers to the usage control information storage unit 12 to execute a preset countermeasure in correspondence to the judgment condition. That is, the countermeasure unit 17 updates the corresponding stored contents in the usage control information storage unit 12. In the example of FIG. 6, when it is judged that, among the judgment conditions registered in the judgment condition DB 18, a specific judgment condition is satisfied, the countermeasure unit 17 refers to the usage control information storage unit 12 to execute the countermeasure associated with the specific judgment condition.

Figure 7:
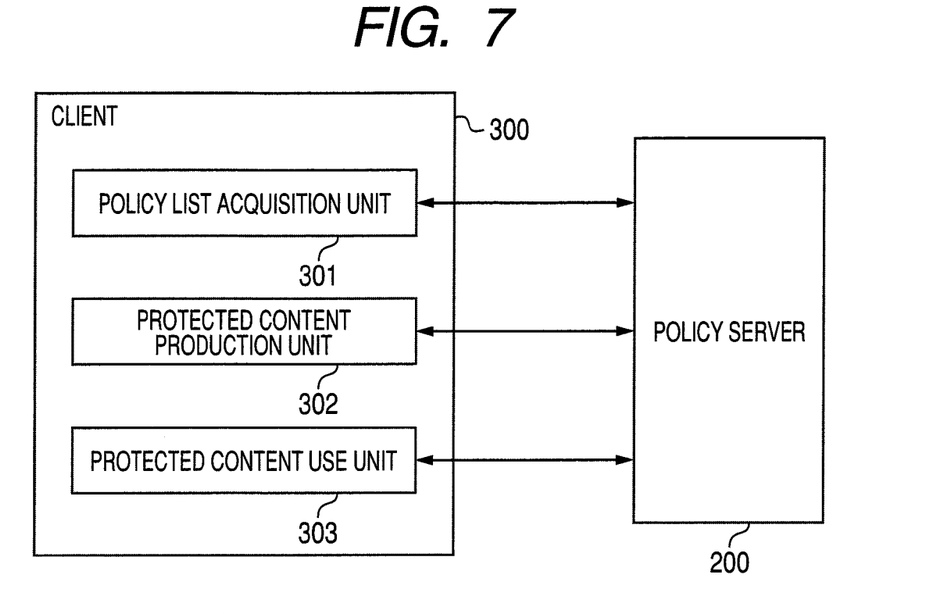
FIG. 7 is a block diagram showing one example of a structure of a client.

In one implementation, the client 300 has a structure shown in FIG. 7. A description will be given hereinafter of one example of the structure of the client 300 with reference to FIG. 7.

In FIG. 7, the client 300 has a policy list acquisition unit 301, a protected content production unit 302, and a protected content use unit 303. The function blocks 301 to 303 are implemented by, e.g., a content processing application.

The policy list acquisition unit 301 sends a request for the policy list to the policy list provision unit 13 based on the instruction form the user, and acquires the policy list from the policy list provision unit 13.

The protected content production unit 302 receives the specification of the content to be protected and the specification of the policy to be imparted to the content from the user, and makes a request for the registration of the association between the specified content and the specified policy to the registration unit 14. In addition, the protected content production unit 302 imparts the content ID to the specified content to produce the protected content.

The protected content use unit 303 receives the specification of the protected content to be used from the user, sends the request for the use information in correspondence to the specified protected content to the provision unit 15, and acquires the use information of the protected content from the provision unit 15. In addition, the protected content use unit 303 performs the process for using the protected content based on the acquired use information.

Each of the policy list acquisition unit 301, the protected content production unit 302, and the protected content use unit 303 mentioned above may receive the input of the authentication information (for example, the user ID and the password) from the user to perform the user authentication based on the authentication information and the organization information in the organization information storage unit 11 at the time of provision of the service to the user, and may provide the service when the user authentication succeeds.

A specific description will be individually given hereinafter of the operations of the information usage control system 1 according to the present embodiment in the production of the protected content, the use of the protected content, and the detection of and the countermeasure against the inconvenience in the policy.

(Production of the Protected Content)

The user specifies the content to be protected and boots the content processing application on the client 300.

When receiving the operation of the user mentioned above, the client 300 (specifically, the content processing application) performs the user authentication process. Specifically, the client 300 receives the input of the authentication information (for example, the user ID and the password) from the user, sends the authentication information to the user authentication server 100, and receives the result of the user authentication based on the authentication information from the user authentication server 100.

When the user authentication fails, the client 300 ends the processing.

On the other hand, when the user authentication succeeds, the client 300 sends the request for the policy list including the user ID for the user to the policy server 200.

When receiving the above-mentioned request for the policy list, the policy server 200 sends the list of, among the policies registered in the policy DB 12a, policies whose registration rights are given to the user indicated by the user ID included in the request to the client 300.

When acquiring the above-mentioned policy list from the policy server 200, the client 300 displays the policy list in a manner that the user is able to understand the policy list (for example, displaying a drop-down list of the policy names), and receives selection of the policy from the policy list.

Subsequently, the client 300 generates the content ID for the above-mentioned specified content and sends the registration request including the content ID, the policy ID for the selected policy, and the user ID for the user (registrant) to the policy server 200.

When receiving the registration request mentioned above, the policy server 200 registers the content ID, the policy ID, the user ID, and the date and time of the registration each included in the registration request in the content DB 12b in association with one another, and reports completion of the registration to the client 300.

When receiving the report of the completion of the registration mentioned above from the policy server 200, the client 300 encrypts the above-mentioned specified content using the preset encryption key, produces the protected content by imparting the content ID to the encrypted content, and stores the protected content in a storage device such as a hard disk or the like.

(Use of the Protected Content)

The user specifies the protected content to be used and boots the content processing application on the client 300.

When receiving the operation of the user mentioned above, the client 300 (specifically, the content processing application) performs the user authentication process. Specifically, the client 300 receives the input of the authentication information (for example, the user ID and the password) from the user, sends the authentication information to the user authentication server 100, and receives the result of the user authentication based on the authentication information from the user authentication server 100.

When the user authentication fails, the client 300 ends the processing.

On the other hand, when the user authentication succeeds, the client 300 reads the content ID from the above-mentioned specified protected content and sends the request including the content ID and the user ID for the user (requester) to the policy server 200.

When receiving the above-mentioned request from the client 300, the policy server 200 refers to the content DB 12b to specify the policy ID associated with the content ID included in the request.

Subsequently, the policy server 200 retrieves the policy indicated by the specified policy ID from the policy DB 12a.

Then, the policy server 200 determines whether or not the use of the content is permitted for the requester based on the retrieved policy and the user ID included in the foregoing request. When the use of the content is permitted, the policy server 200 provides the use information indicative of the usage range permitted for the requester to the client 300, while when the use of the content is not permitted, the policy server 200 sends the information indicating that the use of the content is not permitted to the client 300.

In one specific implementation, the use information shown below is provided.

In the retrieved policy, when the use is permitted for the registrant and the requester corresponds with the registrant, the use information indicative of the usage range in correspondence to the registrant is provided. It is determined whether or not the requester corresponds with the registrant according to whether or not the user ID for the registrant associated with the content ID in the content DB 12b matches with the user ID for the requester.

When a condition does not correspond with the condition described above and the user ID for the requester is directly specified by the policy, the use information indicative of the usage range in correspondence to the user ID is provided.

When a condition does not correspond with any of the conditions described above and a group to which the requester directly belongs is specified by the policy, the use information indicative of the usage range in correspondence to the group is provided.

When a condition does not correspond with any of the conditions described above and a group to which the requester indirectly belongs is specified by the policy, the use information indicative of the usage range in correspondence to the group is provided. The group to which the requester indirectly belongs mentioned herein means a superordinate group to which the group to which the requester directly belongs belongs. For example, when a user x directly belongs to a group X, and the group X belongs to a group Y, the group Y is "a group to which the user x indirectly belongs".

When the client 300 receives the information indicating that the use of the content is not permitted from the policy sever 200, the client 300 performs an error process including displaying of an error message such as "NO ACCESS RIGHT TO SPECIFIED CONTENT" or the like and ends the processing.

When the client 300 receives the use information indicative of the permitted usage range from the policy server 200, the client 300 allows the use of the protected content within the permitted usage range based on the use information.

At this point, the client 300 determines whether or not "READING" is included in the usage range indicated by the use information and, when the "READING" is not included, the client 300 displays an error message such as "NO RIGHT OF READING SPECIFIED CONTENT" or the like, and ends the processing.

On the other hand, when the "READING" is included, the client 300 decrypts the content proper included in the protected content using a preset decryption key and displays the decrypted content proper so that the protected content can be read by the user.

Thereafter, when receiving a request for a specific operation such as editing, saving, printing, macro executing, retrieving, text copying, or the like from the user, the client 300 determines whether or not the specific operation is included in the usage range indicated by the above-mentioned use information. When the specific operation is included, the client 300 performs an error display and, when the specific operation is included, the client 300 permits the specific operation for the user. It is to be noted that the client 300 may request the use information to the policy server 200 every time the client 300 receives the request for the operation.

(Detection of and Countermeasure Against the Inconvenience in the Policy)

Figure 8:
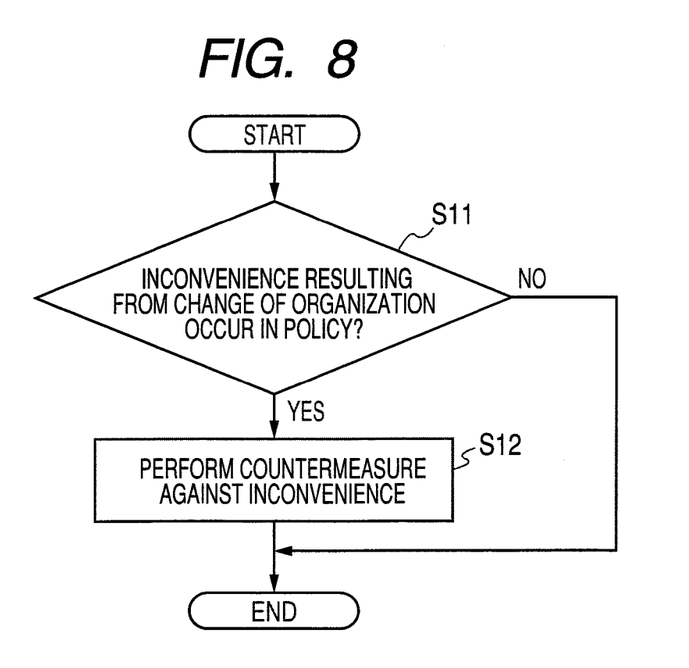
FIG. 8 is a flow chart showing one example of an operation of the information usage control system related to detection of and a countermeasure against an inconvenience in a policy.

FIG. 8 is a flow chart showing one example of the operation of the information usage control system 1 related to the detection of and the countermeasure against the inconvenience in the policy.

First, the policy server 200 judges whether or not the inconvenience resulting from the change of the organization occurs in the policies stored in the usage control information storage unit 12 based on the organization information stored in the organization information storage unit 11 (S11). Specifically, the policy server 200 judges whether or not the judgment conditions registered in the judgment condition DB 18 are satisfied for each of the policies registered in the policy DB 12a based on the current organization information stored in the organization information storage unit 11.

Then, when it is judged that the inconvenience resulting from the change of the organization occurs (S11: YES), the policy server 200 performs the countermeasure against the inconvenience (S12). Specifically, when the policy server 200 determines that, among the judgment conditions registered in the judgment condition DB 18, a specific judgment condition is satisfied, the policy server 200 executes the countermeasure associated with the specific judgment condition in the judgment condition DB 18.

On the other hand, when it is judged that the inconvenience resulting from the change of the organization does not occur (S11: NO), the policy server 200 ends the processing.

Figure 9:
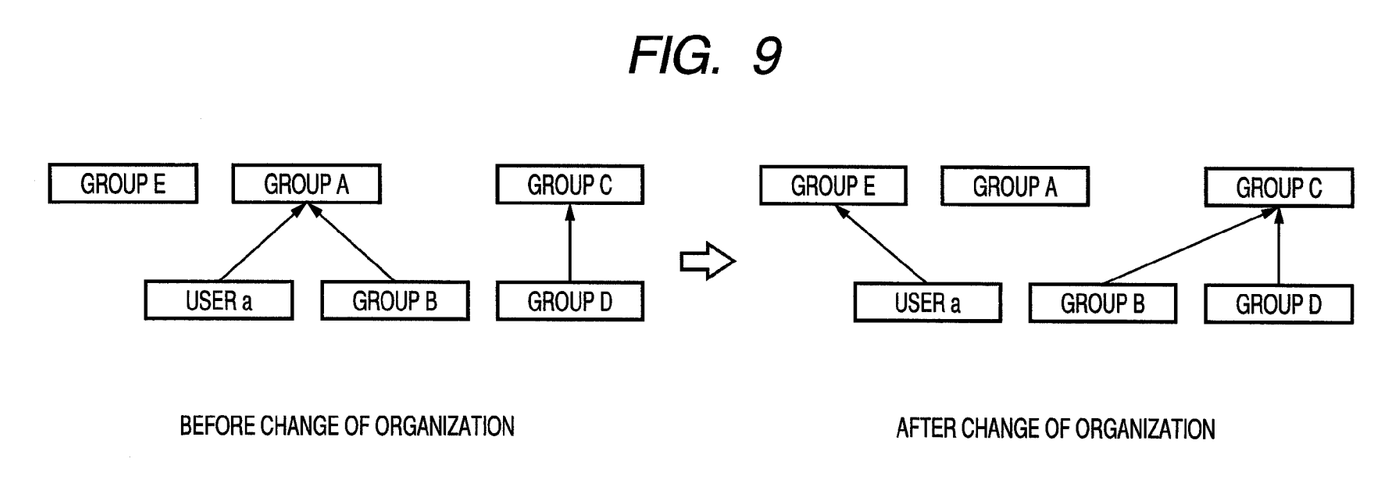
FIG. 9 is a view showing one example of a change of an organization.

FIG. 9 is a view showing one example of the change of the organization. In FIG. 9, before the change of the organization, the organization includes groups A to E, and a user a and the group B belong to the group A and the group D belongs to the group C. After the change of the organization, the organization includes the groups A to E, and the groups B and D belong to the group C and the user a belongs to the group E. In other words, due to the change of the organization, the user a is no longer a member of the group A and is a member of the group E. In addition, the group B is no longer a subordinate group of the group A but the subordinate group of the group C.

A description will be given hereinafter of a specific example of the inconvenience in the policy by taking the case where the change of the organization in FIG. 9 has been performed as an example.

(b 1) It is assumed that this organization has a policy creation rule in which the usage range of the subordinate group is set to be narrower than that of the superordinate group. It is also assumed that there exists a policy for the group C that permits "READING, PRINTING" for the group C. Before the change of the organization, since the group B does not belong to the group C and the policy for the group C does not define the group B, the use is not permitted for the group B so that the policy for the group C does not violate the above-mentioned creation rule. After the change of the organization, since the group B belongs to the group C, the group B is given the same usage range as that of the group C to which the group B belongs based on a preset policy interpretation rule. Accordingly, it follows that the policy for the group C violates the above-mentioned creation rule.

(b 2) It is assumed that the organization has a policy creation rule in which the use is not permitted for a plurality of independent groups. It is also assumed that there exists a policy for the group A that permits the use for groups A and B. Before the change of the organization, since the group B is the subordinate group of the group A and they are not the groups independent of each other, the policy for the group A does not violate the above-mentioned creation rule. After the change of the organization, since the group B is no longer the subordinate group of the group A and they are the groups independent of each other, it follows that the policy for the group A violates the above-mentioned creation rule.

A specific description will be given hereinafter of a process related to the detection of and the countermeasure against the inconvenience in the policy by taking the case where the change of the organization in FIG. 9 has been performed as an example. It is assumed that the stored contents in the policy DB 12a are the same as those shown in FIG. 3, and the stored contents in the judgment condition DB 18 are the same as those shown in FIG. 6. It is also assumed that the organization information in the organization information storage unit 11 has been changed according to the change of the organization mentioned above.

(1) The policy server 200 inspects a policy indicated by the policy ID "0001" in the policy DB 12a as an inspection target for the presence or absence of the inconvenience in a manner shown below.

(1-1) The policy server 200 refers to the first judgment condition "USAGE RANGE OF SUBORDINATE GROUP IN IS EQUAL TO OR WIDER THAN USAGE RANGE OF SUPERORDINATE GROUP IN POLICY" in the judgment condition DB 18. In the policy as the inspection target indicated by the policy ID "0001", the groups A and B are present. Referring to the current organization structure (on the right side of FIG. 9), there is no superordinate-subordinate relation between the groups A and B. In addition, the group A or the group B does not include the subordinate group. Therefore, the policy server 200 judges that the first judgment condition is not satisfied.

(1-2) The policy server 200 refers to the second condition "POLICY IS ASSOCIATED WITH PLURALITY OF INDEPENDENT GROUPS" in the judgment condition DB 18. In the policy as the inspection target indicated by the policy ID "0001", the groups A and B are present. Referring to the current organization structure (on the right side of FIG. 9), since these two groups are independent of each other, the policy is associated with the plurality of independent groups. Therefore, the policy server 200 judges that the second judgment condition is satisfied. Referring to the judgment condition DB 18, "TEMPORARILY HALT TARGET POLICY" is stated in the section of the countermeasure in correspondence to the second judgment condition. Accordingly, the policy server 200 sets the status of the policy indicated by the policy ID "0001" to "HALT" in the policy DB 12a.

(2) The policy server 200 inspects a policy indicated by the policy ID "0002" as the inspection target in the policy DB 12a for the presence or absence of the inconvenience in a manner shown below.

(2-1) The policy server 200 refers to the first judgment condition "USAGE RANGE OF SUBORDINATE GROUP IS EQUAL TO OR WIDER THAN USAGE RANGE OF SUPERORDINATE GROUP IN POLICY" in the judgment condition DB 18. In the policy as the inspection target indicated by the policy ID "0002", the groups C and D are present. Referring to the current organization structure (on the right side of FIG. 9), these two groups are in the superordinate-subordinate relation with each other. In addition, the group C has the group B as the subordinate group. Referring to the usage range information of the policy, the usage range of the subordinate group D is narrower than that of the superordinate group C. Since the group B is not defined by the policy, based on the preset policy interpretation rule, it is interpreted that the group B is to be given the same usage range as that of the group C to which the group B belongs. Therefore, the usage range of the subordinate group B is equal to that of the superordinate group, and the policy server 200 accordingly judges that the first judgment condition is satisfied. Referring to the judgment condition DB 18, "TEMPORARILY HALT TARGET POLICY" is stated in the section of the countermeasure in correspondence to the first judgment condition. Accordingly, the policy server 200 sets the status of the policy indicated by the policy ID "0002" to "HALT" in the policy DB 12a.

(2-2) The policy server 200 refers to the second judgment condition "POLICY IS ASSOCIATED WITH PLURALITY OF INDEPENDENT GROUPS" in the judgment condition DB 18. In the policy as the inspection target indicated by the policy ID "0002", the groups C and D are present. Referring to the current organization structure (on the right side of FIG. 9), these two groups are in the superordinate-subordinate relation with each other. Therefore, the policy is not associated with the plurality of independent groups and the policy server 200 accordingly judges that the second judgment condition is not satisfied.

(Second Embodiment)

A description will be given hereinafter of an information usage control system according to a second embodiment. Because the information usage control system and the above-described information usage control system 1 according to the first embodiment have many parts in common, the description of the parts common to those in the first embodiment will be omitted by retaining the same reference numerals in the following description.

In the present embodiment, the usage control information storage unit 12 stores the policy, which is for controlling the use of the content by the user in the organization defined by the organization information and permits the use of the content for the registrant within the specific usage range, in association with the content and the registrant of the content.

The "registrant" mentioned herein means a user who has registered the association between the content and the policy in the usage control information storage unit 12.

As in the case with the first embodiment, the policy is the information defining the user or the group of the user permitted to use the content and the usage range of the content permitted for the user or the group of the user.

In the present embodiment, the usage control information storage unit 12 defines the registrant of the content as the user permitted to use the content, and stores the policy defining the usage range permitted for the registrant. It is to be noted that the usage control information storage unit 12 may store the policy that does not permit the use of the content for the registrant in addition to the policy that permits the use of the content for the registrant.

In one implementation, the usage control information storage unit 12 is structured to store the association between the content, the policy, and the registrant of the content as well as one or more pre-created common policies, and a plurality of different contents can be protected by the same policy. It is to be noted that the usage control information storage unit 12 may store, e.g., a policy for a specific content in association with the specific content and the registrant.

The usage control information storage unit 12 has, e.g., the policy DB 12a for managing the policy and the content DB 12b for managing the association between the content, the policy to be applied to the content, and the registrant of the content.

The policy DB 12a stores, e.g., the information shown in FIG. 3. In FIG. 3, in the policies indicated by the policy IDs "0001" and "0002", "REGISTRANT" is defined as a permitted user, and "READING, EDITING, PRINTING" are defined as permitted operations.

The content DB 12b stores, e.g., the information shown in FIG. 4. In FIG. 4, for each content, the content ID for the content, the policy ID for the policy to be applied to the content, the user ID for the registrant of the content, the date and time of the registration of the content, and the status of the content are recorded in association with one another in the content DB 12b.

The judgment unit 16 judges whether or not the inconvenience resulting from the change of the organization occurs in the usage range permitted for the registrant in the usage control information storage unit 12 based on the organization information stored in the organization information storage unit 11.

Specifically, the judgment unit 16 refers to the organization information in the organization information storage unit 11 to judge whether or not the inconvenience resulting from the change of the organization occurs in the usage range permitted for the registrant of the content for each of the contents stored in the content DB 12b based on the preset judgment condition. The usage range permitted for the registrant of the content is defined by the policy stored in association with the content in the policy DB 12a. The judgment unit 16 judges, e.g., whether or not the judgment condition is satisfied for each of the contents. The judgment condition may appropriately be set so as to be capable of detecting the inconvenience resulting from the change of the organization, and may be determined, e.g., in the organization.

The timing of execution of the above-mentioned judgment is not particularly limited, and examples thereof include a periodic timing (e.g., at two o'clock in the morning every day), a time when the organization information is changed, a time when the execution of the judgment is instructed by the manager, and the like.

Examples of the above-mentioned inconvenience resulting from the change of the organization include (a 1) and (a 2) described above.

In the example of FIG. 1, the information usage control system has the judgment condition DB 18 for managing the judgment condition, and the judgment unit 16 judges whether or not the inconvenience resulting from the change of the organization occurs in the usage range of the registrant for each of the contents in the content DB 12b based on the judgment condition registered in the judgment condition DB 18.

Figure 10:
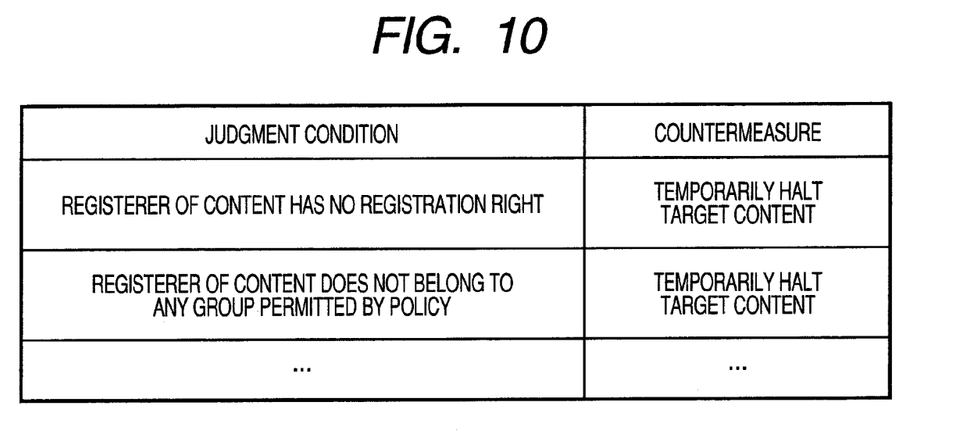
FIG. 10 is a view showing one example of stored contents in a judgment condition DB in a second embodiment.

FIG. 10 shows one example of stored contents in the judgment condition DB 18 in the present embodiment. In FIG. 10, the judgment condition and the countermeasure to be taken when the judgment condition is satisfied are stored in association with each other in the judgment condition DB 18.

The countermeasure unit 17 performs the countermeasure against the inconvenience when the judgment unit 16 judges that the inconvenience resulting from the change of the organization occurs.

Examples of the countermeasure against the inconvenience include a process for halting the use of the content in which the inconvenience is judged to occur (hereinafter referred to as "a target content"), a process for canceling permission for the use by the registrant of the target content, and a process for narrowing the usage range of the registrant of the target content (for example, limiting the usage range only to reading).

In one implementation, when the judgment unit 16 judges that the judgment condition is satisfied, the countermeasure unit 17 executes the preset countermeasure in correspondence to the judgment condition. In the example of FIG. 10, when it is judged that, among the judgment conditions registered in the judgment condition DB 18, a specific judgment condition is satisfied, the countermeasure unit 17 executes the countermeasure associated with the specific judgment condition.

Figure 11:
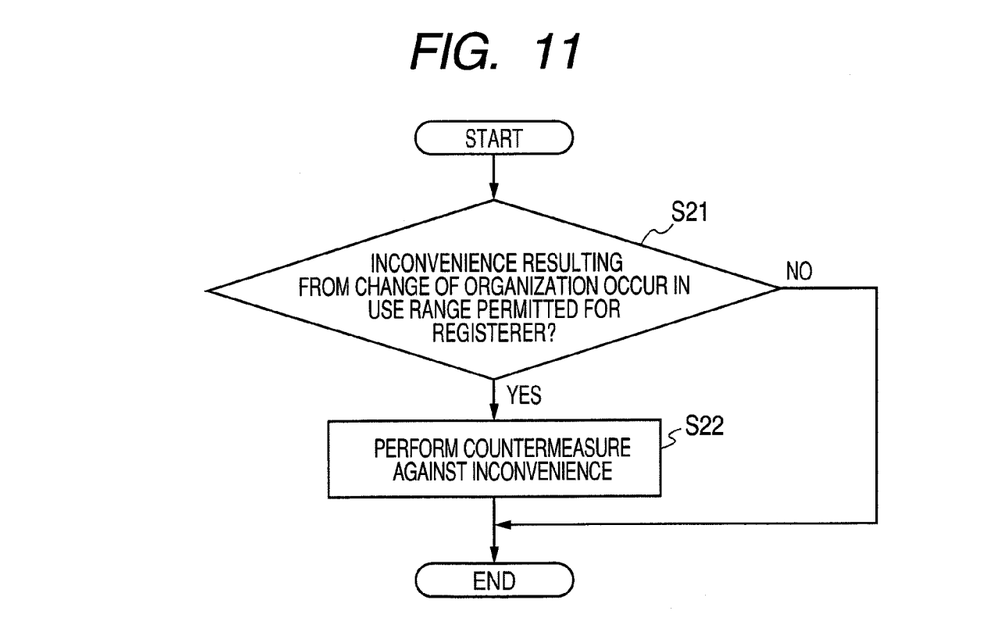
FIG. 11 is a flow chart showing one example of an operation of the information usage control system related to detection of and a countermeasure against the inconvenience in a usage range of a registrant.

FIG. 11 is a flow chart showing one example of the operation of the information usage control system related to the detection of and the countermeasure against the inconvenience in the usage range of the registrant.

First, based on the organization information stored in the organization information storage unit 11, the policy server 200 judges whether or not the inconvenience resulting from the change of the organization occurs in the usage range permitted for the registrant of the content by the information stored in the usage control information storage unit 12 (S21). Specifically, the policy sever 200 judges whether or not the judgment condition registered in the judgment condition DB 18 is satisfied for each of the contents registered in the content DB 12*b* based on the current organization information stored in the organization information storage unit 11.

Subsequently, when it is judged that the inconvenience resulting from the change of the organization occurs (S21: YES), the policy server 200 performs the countermeasure against the inconvenience (S22). Specifically, when it is determined that, among the judgment conditions registered in the judgment condition DB 18, a specific judgment condition is satisfied, the policy server 200 executes the countermeasure associated with the specific judgment condition in the judgment condition DB 18.

A specific example of the inconvenience in the policy will be shown hereinafter by taking the case where the change of the organization in FIG. 9 has been performed as an example.

It is assumed that there exists a policy for a group A that permits "READING, PRINTING" for the group A and "READING, EDITING, PRINTING" for a registrant. It is also assumed that the registration right of the policy for the group A is given only to the group A. Accordingly, the policy for the group A can be associated with the content only by the user in the group A, and the registrant is limited to the user in the group A. That is, the policy for the group A is created with the intention of limiting the use of the content to the group A.

It is assumed that a user a in the group A has registered a content α in association with the above-mentioned policy for the group A before the change of the organization.

Thereafter, when the change of the organization is performed and the user a is assigned to the group E from the group A, since the user a is the registrant of the content α, the use of the content α is permitted for the user a. With this permission, it follows that the use of the content is permitted for the user in the group other than the group A, which runs counter to the intention of creation of the policy for the group A.

A specific description will be given hereinafter of the process related to the detection of and the countermeasure against the inconvenience in the usage range of the registrant by taking the case where the change of the organization in FIG. 9 has been performed as an example. It is assumed that the stored contents in the policy DB 12*a* are the same as those shown in FIG. 3, the stored contents in the content DB 12*b* are the same as those shown in FIG. 4, and the stored contents in the judgment condition DB 18 are the same as those shown in FIG. 10. It is also assumed that the organization information in the organization information storage unit 11 has been changed according to the change of the organization described above.

(3) The policy server 200 inspects the first content in the content DB 12*b* as an inspection target for the presence or absence of the inconvenience in a manner shown below.

(3-1) The policy server 200 refers to the first judgment condition "REGISTRANT OF CONTENT HAS NO REGISTRATION RIGHT" in the judgment condition DB 18. Referring to the content DB 12*b*, the user ID for the registrant of the first content as the inspection target is "USER a", and the policy ID for the policy to be applied to the content is "0001". Referring to the policy DB 12*a*, the registration right of the policy indicated by the policy ID "0001" is given to the group A. Referring to the current organization structure (on the right side of FIG. 9), the user a is not included in the group A, and accordingly, the user a, i.e., the registrant of the content has no registration right. Therefore, the policy server 200 judges that the first judgment condition is satisfied. Referring to the judgment condition DB 18, "TEMPORARILY HALT TARGET CONTENT" is stated in the section of the countermeasure in correspondence to the first judgment condition. Accordingly, the policy server 200 sets the status of the first content to "HALT" in the content DB 12*b*.

(3-2) The policy server 200 refers to the second judgment condition "REGISTRANT OF CONTENT DOES NOT BELONG TO ANY GROUP PERMITTED BY POLICY" in the judgment condition DB 18. Referring to the content DB 12*b*, the user ID for the registrant of the first content as the inspection target is "USER a", and the policy ID for the policy to be applied to the content is "0001". Referring to the policy DB 12*a*, the use of the content is permitted for the groups A and B in the policy indicated by the policy ID "0001". Referring to the current organization structure (on the right side of FIG. 9), the user a is not included in the group A or the group B, and accordingly, the user a, i.e., the registrant of the content does not belong to any group permitted by the policy. Therefore, the policy server 200 judges that the second judgment condition is satisfied. Referring to the judgment condition DB 18, "TEMPORARILY HALT TARGET CONTENT" is stated in the section of the countermeasure in correspondence to the second judgment condition. Accordingly, the policy server 200 sets the status of the first content to "HALT" in the content DB 12*b*.

It is to be noted that the present invention is not limited to the embodiments described above and various changes and modifications can be made therein without departing from the spirit and scope thereof.

Figure 12:
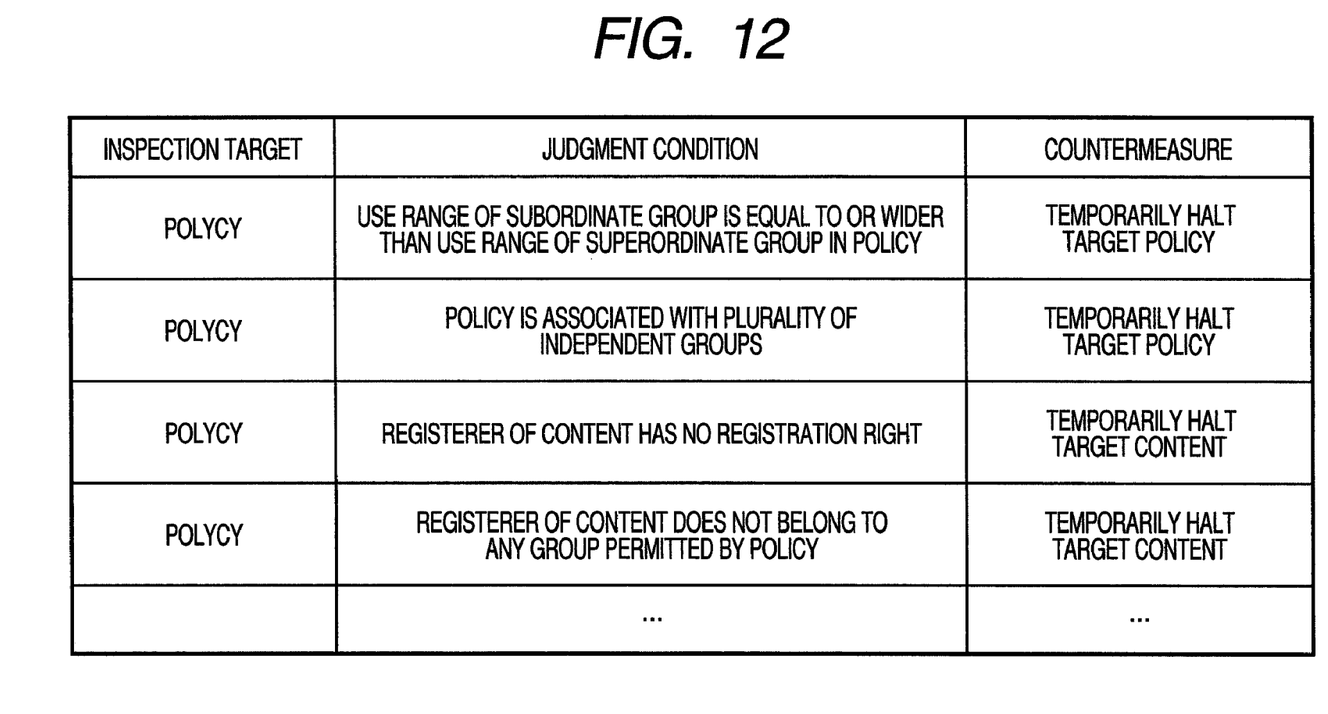
FIG. 12 is a view showing another example of the stored contents in the judgment condition DB.

For example, the above-described first and second embodiments may be combined. That is, the information usage control system may have the function of detecting and taking the countermeasure against the inconvenience resulting from the change of the organization in the policy and the function of detecting and taking the countermeasure against the inconvenience resulting from the change of the organization in the usage range of the registrant of the content. In this case, for example, information shown in FIG. 12 is stored in the judgment condition DB 18. In FIG. 12, the inspection target, the judgment condition, and the countermeasure are registered in association with one another. A record having "POLICY" as the inspection target is used for the detection of the inconvenience resulting from the change of the organization in the policy, while a record having "CONTENT" as the inspection target is used for the detection of the inconvenience resulting from the change of the organization in the usage range of the registrant of the content.

In addition, in the first embodiment described above, all policies are the inspection targets for all judgment conditions. However, the judgment condition to be applied to the policy may be defined for each policy. In this case, for example, identification information (ID) is imparted to each judgment condition, and the ID for the judgment condition to be applied to the policy is registered for each policy in the policy DB 12*a*.

Moreover, for example, in terms of maintenance of the policy or the like by the manager, the information usage control system may have the function of displaying the policy or the content of which the use is halted by the countermeasure unit 17 in list form.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing system, in an environment where there are provided
    an organization information storage for storing organization information which defines an organization including users and groups of the users,
    a usage control information storage for storing usage control information for
        controlling use of control target information by each user in the organization defined by the organization information and
        defining a user or a group of users permitted to use the control target information and a usage range of the control target information in which the user or the group of the users is permitted to use the control target information,
    a judging information storage for storing judging information for judging whether or not an inconvenience resulting from a change of the organization occurs, and
    a processor,
    the system comprising:
    a judgment unit, executed on the processor, that judges, based on the judging information and the organization information, whether or not the inconvenience resulting from the change of the organization occurs, the inconvenience indicating that the usage control information stored in the usage control information storage cannot be used to control use of the control target information as a result of the change of the organization; and
    a countermeasure unit that performs a countermeasure against the inconvenience in a case where the judgment unit judges that the inconvenience resulting from the change of the organization occurs, the countermeasure comprising a process for halting use of the usage control information or the control target information.

2. An information processing system, in an environment where there are provided
    an organization information storage for storing organization information which defines an organization including users and groups of the users,
    a usage control information storage for storing usage control information for
        controlling use of control target information by each user in the organization defined by the organization information and
        permitting the use of the control target information for a registrant within a specific usage range in association with the control target information and the registrant of the control target information,
    a judging information storage for storing judging information for judging whether or not an inconvenience resulting from a change of the organization occurs, and
    a processor,
    the system comprising:
    a judgment unit, executed on the processor, that judges, based on the judging information and the organization information, whether or not the inconvenience resulting from the change of the organization occurs, the inconvenience indicating that the usage range permitted for the registrant in the usage control information storage cannot be used to control use of the control target information as a result of the change of the organization; and
    a countermeasure unit that performs a countermeasure against the inconvenience in a case where the judgment unit judges that the inconvenience resulting from the change of the organization occurs, the countermeasure comprising a process for halting use of the usage control information or the control target information.

3. The information processing system as claimed in claim 1, further comprising:
    the organization information storage;
    the usage control information storage;
    the judging information storage; and
    the processor.

4. The information processing system as claimed in claim 2;
    further comprising:
    the organization information storage;
    the usage control information storage;
    the judging information storage; and
    the processor.

5. The information processing system as claimed in claim 1, wherein the countermeasure further comprises one or more of canceling of permission for use by, among the users or the groups of the users permitted by the usage control information in which the inconvenience is judged to occur, a part of the users or the groups of the users, and narrowing of the usage range permitted by the usage control information in which the inconvenience is judged to occur.

6. An information processing method, in an environment where there are provided
    an organization information storage for storing organization information which defines an organization including users and groups of the users,
    a usage control information storage for storing usage control information for
        controlling use of control target information by each user in the organization defined by the organization information and
        defining a user or a group of users permitted to use the control target information and a usage range of the control target information in which the user or the group of the users is permitted to use the control target information,
    a judging information storage for storing judging information for judging whether or not an inconvenience resulting from a change of the organization occurs, and
    a processor,
    the method comprising:
    judging using the processor and based on the judging in information and the organization information, whether or not the inconvenience resulting from the change of the organization occurs, the inconvenience indicating that the usage control information stored in the usage control information storage cannot be used to control use of the control target information as a result of the change of the organization; and
    performing a countermeasure against the inconvenience in a case where the inconvenience resulting from the change of the organization is judged to occur, the countermeasure comprising a process for halting use of the usage control information or the control target information.

7. An information processing method, in an environment where there are provided
    an organization information storage for storing organization information which defines an organization including users and groups of the users,
    a usage control information storage for storing usage control information for controlling use of control target information by each user in the organization defined by the organization information and permitting the use of the control target information for a registrant within a specific usage range in association with the control target information and the registrant of the control target information, a judging information storage for storing judging information for judging whether or not an inconvenience resulting from a change of the organization occurs, and a processor, the method comprising:

judging, using the processor and based on the judging information and the organization information, whether or not the inconvenience resulting from the change of the organization occurs, the inconvenience indicating that the usage range permitted for the registrant in the usage control information storage cannot be used to control use of the control target information as a result of the change of the organization; and performing a countermeasure against the inconvenience in a case where the inconvenience resulting from the change of the organization is judged to occur, the countermeasure comprising a process for halting use of the usage control information or the control target information.

8. A non-transitory computer readable medium storing a program causing a computer to execute a process for performing information processing, in an environment where there are provided an organization information storage for storing organization information which defines an organization including users and groups of the users, a usage control information storage for storing usage control information for controlling use of control target information by each user in the organization defined by the organization information and defining a user or a group of users permitted to use the control target information and a usage range of the control target information in which the user or the group of the users is permitted to use the control target information, and a judging information storage for storing judging information for judging whether or not an inconvenience resulting from a change of the organization occurs, the process comprising:

judging, based on the judging information and the organization information, whether or not the inconvenience resulting from the change of the organization occurs, the inconvenience indicating that the usage control information stored in the usage control information storage cannot be used to control use of the control target information as a result of the change of the organization; and performing a countermeasure against the inconvenience in a case where the inconvenience resulting from the change of the organization is judged to occur, the countermeasure comprising a process for halting use of the usage control information or the control target information.

9. A non-transitory computer readable medium storing a program causing a computer to execute a process for performing information processing, in an environment where there are provided an organization information storage for storing organization information which defines an organization including users and groups of the users, a usage control information storage for storing usage control information for controlling use of control target information by each user in the organization defined by the organization information and permitting the use of the control target information for a registrant within a specific usage range in association with the control target information and the registrant of the control target information, and a judging information storage for storing judging information for judging whether or not an inconvenience resulting from a change of the organization occurs, the process comprising:

judging, using the processor and based on the judging information and the organization information, whether or not the inconvenience resulting from the change of the organization occurs, the inconvenience indicating that the usage range permitted for the registrant in the usage control information storage cannot be used to control use of the control target information as a result of the change of the organization; and performing a countermeasure against the inconvenience in a case where the inconvenience resulting from the change of the organization is judged to occur, the countermeasure comprising a process for halting use of the usage control information or the control target information.

\* \* \* \* \*